Figure 5:
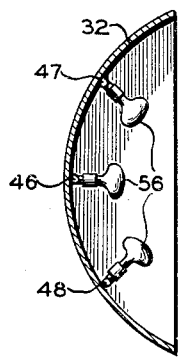

Feb. 21, 1950 A. L. LEETH 2,498,560
DRIER
Filed Aug. 6, 1946 3 Sheets-Sheet 1
FIG. 1
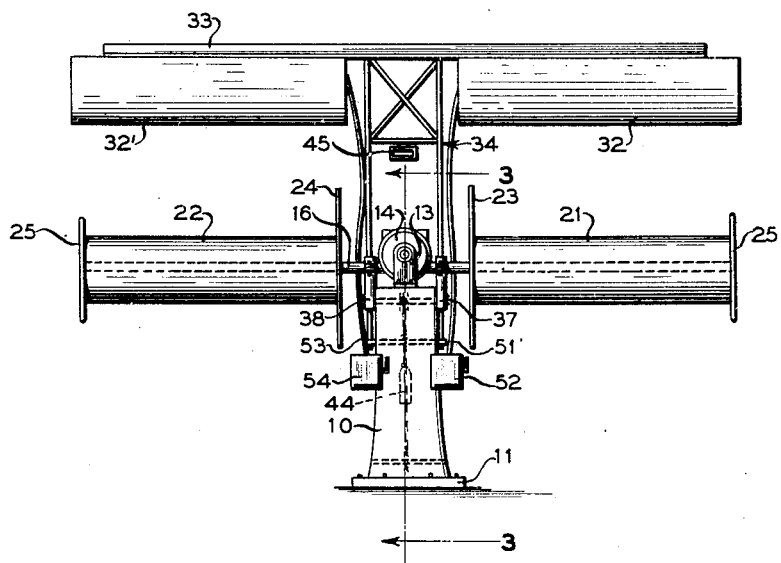
FIG. 2
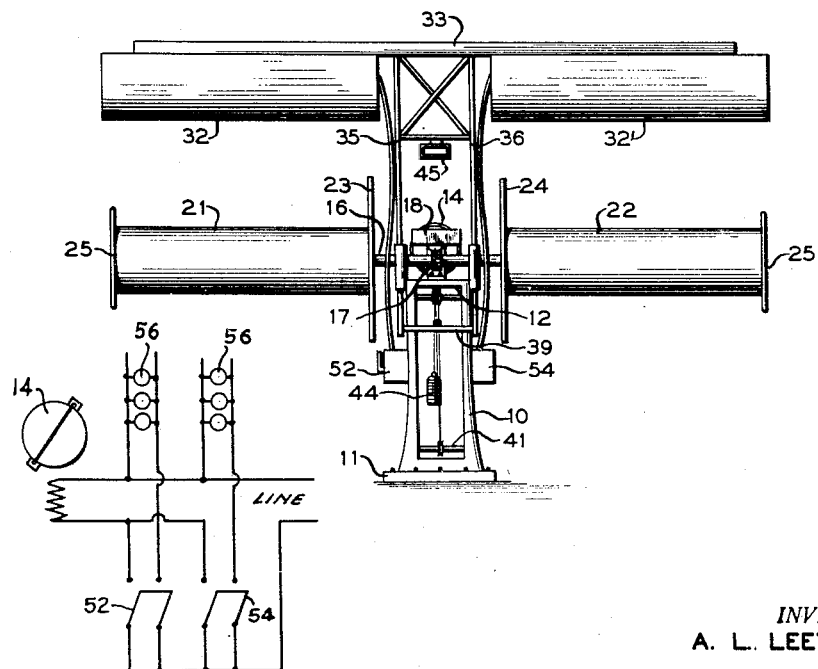
FIG. 11
*INVENTOR.*
A. L. LEETH
BY
ATTORNEY Feb. 21, 1950            A. L. LEETH            2,498,560
DRIER Filed Aug. 6, 1946                                        3 Sheets-Sheet 2

*INVENTOR.*
A. L. LEETH
BY
ATTORNEY

Feb. 21, 1950 — A. L. LEETH — 2,498,560
DRIER
Filed Aug. 6, 1946 — 3 Sheets-Sheet 3

INVENTOR.
A. L. LEETH
BY
ATTORNEY

Patented Feb. 21, 1950

2,498,560

UNITED STATES PATENT OFFICE 2,498,560

DRIER

Ashby L. Leeth, Bethesda, Md.

Application August 6, 1946, Serial No. 688,671

9 Claims. (Cl. 34—87)

1

This invention relates to improvements in drying machines and particularly to machines for drying annular objects such as pneumatic tire casings.

During the tire shortage occasioned by the economic disruption due to war conditions, it became necessary to prolong the life of pneumatic tires by repairing and recapping the tire casings. Because of the large amount of such repairing and recapping work, methods and materials have been developed which have rendered these operations highly successful, and it is anticipated that the repairing and recapping of tire casings will constitute a relatively important business project in the future.

While a considerable amount of the equipment has already been developed, as indicated above, there is a problem for which no adequate solution has so far been provided. The processes used in repairing and recapping tire casings all require that the casing be absolutely dry at the time the repair or recap is applied. Under present conditions, if tires are brought in for repair during wet weather or are driven to a repair station over wet streets, the casings will be too wet for repairing when removed from the vehicle and must be kept in dry storage a sufficient period of time to allow them to become thoroughly dry before any repair can be made. This involves not only the necessity of a considerable amount of storage space but also a large amount of time lost in the use of the tires and in some cases even in the operation of a vehicle.

Also in damp weather or in humid climates, the tires, even in storage, may become sufficiently damp that it is difficult to make a successful repair or recapping operation.

It is therefore an object of the present invention to provide apparatus for quickly and thoroughly drying articles such as pneumatic tire casings.

A further object resides in the provision of tire drying apparatus which is economical to manufacture and operate and does not require a high degree of skill in its operation.

A still further object resides in the provision of a tire drier which will not injure the tire casings by overheating any part of the casing during the drying operation.

An additional object resides in the provision of an improved tire drier which is electrically operated and operates on the electrical facilities normally provided in garages and filling stations and does not require an excessive amount of electrical current so that it may be used in any

2 location supplied with conventional electrical facilities.

Figure 4:
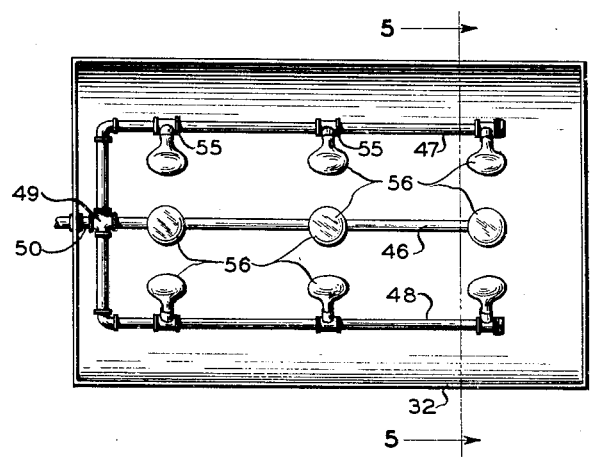
Figure 3:
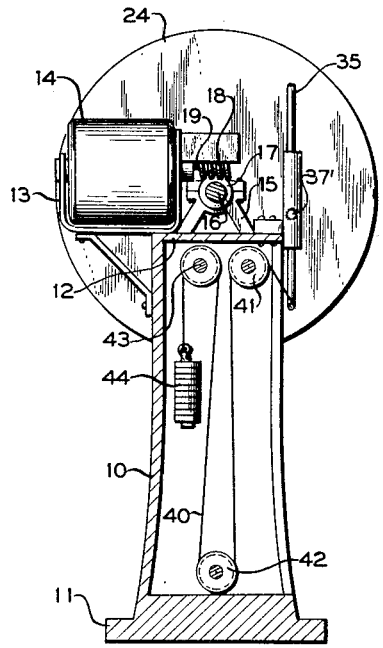
Figure 9:
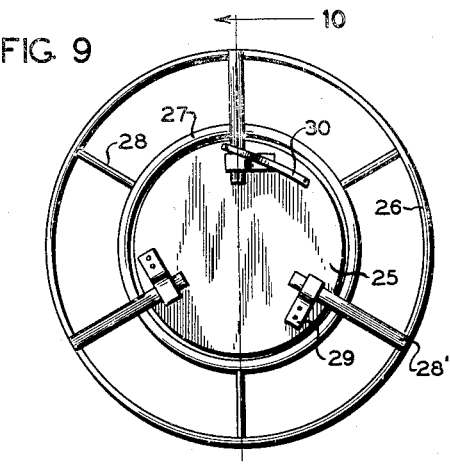
Figure 10:
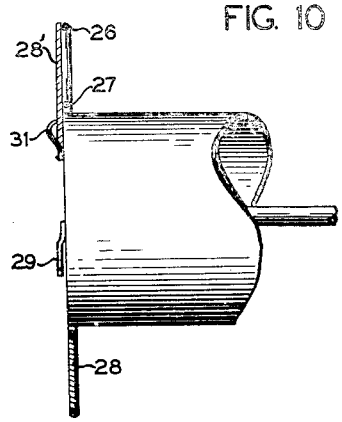
Figure 6:
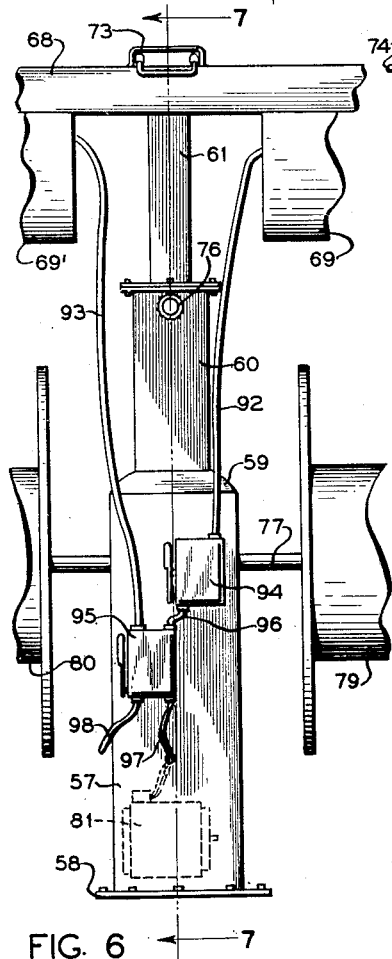
Figure 7:
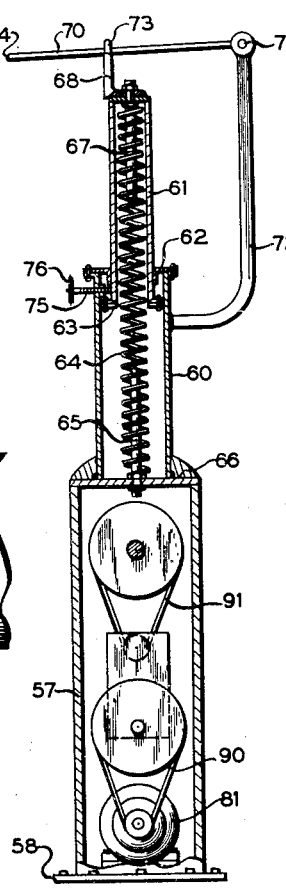
Figure 8:
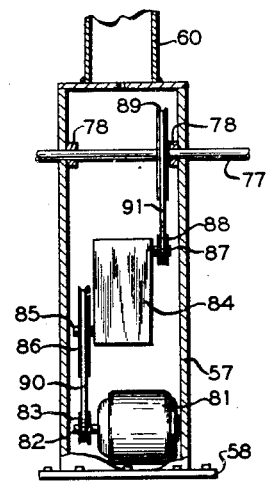

Further objects and advantages of my invention will be apparent from the following specification taken in conjunction with the accompanying drawings, wherein:

Fig. 1 is a front elevational view of a tire drier illustrative of one form of the invention;

Fig. 2, a rear elevational view of the tire drier;

Fig. 3, a transverse sectional view on the line 3—3 of Fig. 1;

Fig. 4, a bottom plan view of the drying hood showing the arrangement of heat radiation lamps therein;

Fig. 5, a sectional view on the line 5—5 of Fig. 4;

Fig. 6, a fragmentary front elevation showing a modified form of the invention;

Fig. 7, a transverse sectional view on the line 7—7 of Fig. 6;

Fig. 8, a fragmentary rear elevation with parts in section for added clearness;

Fig. 9, a detail in elevation showing the removable retaining flange fastening means;

Fig. 10, a transverse sectional view on the line 10—10 of Fig. 9; and

Fig. 11, a diagram of the electrical circuit employed.

With continued reference to the drawings, the drier has a pedestal or standard 10 which may be in the form of a hollow columnar casting having a base flange 11 which may be screwed or otherwise secured to the floor on which the machine is mounted. The pedestal has a flat closed upper end 12 upon which is mounted a bracket or support 13 for an electric motor 14. A pair of journal brackets, one of which is indicated at 15 in Fig. 3, are also mounted on the upper end of the pedestal and rotatively support a substantially horizontal shaft 16 which extends outwardly at opposite sides of the pedestal. Between the journal brackets a worm wheel 17 is secured on the shaft and is engaged by a worm 18 on the motor shaft 19.

With this arrangement, whenever the motor 14 is energized, the shaft 16 will rotate slowly in its bearings in the pedestal carried journal brackets.

Each projecting end portion of the shaft 16 carries an elongated cylindrical drum arranged substantially concentric with the shaft, the right hand drum being indicated at 21 and the left hand drum at 22. At the inner end of the drum 21 there is a flange or abutment member 23 in the form of a circular disc secured to the inner end of the drum and spaced from the pedestal 10 sufficiently to avoid any interference with the pedestal when the drum is rotated. At the inner end of the drum 22 there is a similar circular shield or abutment 24. The drums may be secured on the shaft by suitable disc members 25 located at the outer ends of the drums. The inner ends of the drums may be supported on the abutment plates 23 and 24 or supporting discs may be provided within the inner ends of the drums if desired.

As best shown in Figs. 9 and 10, there is provided a removable retaining flange for the outer ends of the drums 21 and 22 to retain the tires in place thereof during operation of the machine. The retaining flange comprises an outer ring 26 of the proper diameter to prevent accidental removal of tires on the drum, the ring 26 being connected to an inner ring 27 by spoke members 28 with the diameter of the inner ring being substantially the same as the diameter of the drums. Additional spoke members 28' formed of flat metal connect the outer and inner rings and extend inwardly beyond the inner ring to engage under clip members 29 secured at one end thereof on the disc members 25. By rotation of the ring 26 with relation to the drum, spoke members 28 will either engage under the clips 29 or be disengaged therefrom, depending on the direction of rotation, thus providing a retaining flange which may be easily and quickly removed for the application of tires to the drum and reapplied to hold the tires thereon during operation.

In order to prevent accidental removal of the flange, there is provided a retaining latch in the form of an elongated spring member 30 secured at one end to the disc member 25, the opposite end of which is curved outwardly, as shown at 31, and then inwardly to project through an aperture in the disc member located adjacent the open end of one of the clip members 29. With the retaining flange in position on the drum, the end of the spring latch 30 will engage in back of one of the spoke members 28 holding the spoke member under the clip and preventing relative rotation between the retaining flange and the drum and thus prevent removal of the retaining flange. In order to remove the flange it is only necessary to raise the outer end of the spring at the curved portion 31 until the spoke member 28 is free to move beneath the end of the spring member, at which time the retaining flange may be rotated to disengage the spoke members 28 and the latches 29. To reapply the retaining flange it is only necessary to raise the spring member 30 and rotate the spoke members 28 into engagement with the latch members 29 and release the spring to lock the retaining flange in place.

It is thus seen that there is provided by the above structure a very simple but effective retaining flange and one that is easily removable and replaceable and which can be locked in position against accidental removal.

Respective hoods 32 and 32' of arcuate cross-sectional shape are supported above the drums 21 and 22 by suitable means which may include the substantially horizontal bar 33 extending along the tops of the hoods and secured intermediate its length to the upper end of a frame 34, the lower end of which is mounted upon the pedestal 10. The frame 34 preferably comprises two spaced apart legs 35 and 36, the lower end portions of which slide through respective tubular guide members 37 and 38 mounted on the pedestal 10 at opposite sides of the rear portion of the pedestal top. If desired, the lower ends of the legs 35 and 36 may be joined by a transverse member or portion 39 which may be connected to one end of a cable 40 which is led over suitable sheaves 41, 42, and 43, journalled in the pedestal 10 and has connected to its opposite end a counterbalancing weight 44.

By this means the two hoods 32 and 32' may be easily moved up and down or away from and toward the drums 21 and 22 and will remain in adjusted position. For convenience a handle 45 may be provided on the frame 34 to raise and lower the hoods, and a set screw 37' is provided in the guide 37 to lock the hoods in adjusted position.

Within each hood there is provided a plurality of conduits for electrical connectors, the arrangement particularly illustrated in Fig. 4, comprising a central conduit 46 and side conduits 47 and 48 parallel to the central conduit. All of the conduits are brought to a four-way union 49 from which a single conduit 50 leads to the exterior of the hood. The conduit 50 is continued by a flexible conduit 51 to a switch box 52 mounted upon the pedestal below the rotatable drums. A similar flexible conduit 53 leads from the hood 32' to a switch box 54. The switch boxes 52 and 54 may also contain heat control units if desired.

Each of the conduits 46, 47 and 48 is provided at spaced intervals with bulb sockets 55 which receive infra red or heat radiating electric bulbs 56. The hood 32' contains a conduit and heat radiating bulb arrangement similar to that illustrated in Figs. 4 and 5 and described above in connection with the hood 32.

The power circuits for the infra red lights and motor shown in Fig. 11 are connected through the switch boxes 52 and 54 in such a manner that when either switch is thrown to on position the motor 14 will be energized rotating the drums 21 and 22. This circuit arrangement is provided in order to prevent any possibility of the heat radiating infra red lamps being on when the drum is not rotating which, if tires were present thereon, would cause burning and permanent damage thereto.

In operation, when it is desired to dry tire casings one or both of the retaining flanges 26 are removed and tire casings are passed over the drums, after which the retaining flanges are replaced. The hoods 32 and 32' are lowered into position with the infra red lamps spaced approximately 6 to 8 inches from the tires. Either or both of the switches 52 and 54 are then thrown to on position to supply current to the infra red lamps and to energize the motor 14 whereby heat from the hoods will be concentrated on the upper surface of the rotating tire casings in a manner to quickly evaporate any moisture from the casings as they are rotated beneath the hoods.

In Figs. 6, 7 and 8 there is disclosed a modified form of the invention in which there is provided a supporting pedestal 57 mounted on a base 58 which may be secured to the floor or merely rest thereon. The pedestal may be either a casting or may be fabricated from metal plates welded together at the corners. Secured to the top of the pedestal 57 at 59 as by welding, is a square tubular upstanding member 60 within which is slidably and telescopically received a square tubular supporting member 61. Mounted on the upper end of the tubular member 60 is an inwardly extending flange member 62, the inner surface of which is machined to fit the external surface of supporting member 61 and on the lower end of member 61 there is secured a flange 63 extending outwardly therefrom, the outer surface of which is machined to engage the inner surface of member 60. Flanges 62 and 63 cooperate to guide the member 61 in its vertical movement within the member 60.

In order to counterbalance the weight of supporting member 61 and the apparatus carried thereby, there is provided within the members 60 and 61 an elongated coil spring 64. In order to guide the spring and prevent buckling thereof, there is provided within the member 60 a rod or pipe 65 secured to the member 66 of the top of the supporting column 67 and extending upwardly within the spring 64. A similar tube or pipe 67 is secured to the upper end of supporting member 61 and extends downwardly within the spring 64. The guide members 65 and 67 are so proportioned as to length that when the supporting member 61 is in its lowermost position the ends of the guide members are slightly spaced, thus permitting the fullest possible action.

Secured to the upper end of the supporting member 61 is a substantially horizontal supporting bar 68 which supports hoods 69 and 69' which hoods and the infra red heat radiating lamps contained therein are identical to hoods 32 and 32' described above in connection with the first modification.

In order to conveniently raise and lower the lamp containing hoods, there is provided a handle member 70 pivoted at its inner end at 71 to a fulcrum member 72 secured to the member 60 as by welding. The handle member 70 extends forwardly from the pivot point 71 through a loop member 73 secured to the horizontal bar 68 at its mid point. By grasping the forward end 74 of the handle 70, the supporting member 61 and the hoods may be easily raised or lowered.

In order to securely hold the hoods in any given position there is provided in the member 60 a clamping set screw 75 threadedly received in the member 60 and engaging the supporting member 61 to lock the same in position. For conveniently operating the set screw 75, there is provided on the outer end thereof a knurled handle or the like 76.

A drum supporting shaft 77 is rotatably received in bearings 78 in the pedestal 57 adjacent the top thereof and extends outwardly on both sides of the pedestal to support drums 79 and 80 in a manner similar to that described in connection with the first modification, the drums being identical to those described therein.

Completely enclosed within the pedestal 57 there is provided a driving means for the shaft 77 comprising a motor 81 having a motor shaft 82 and a V pulley 83 secured thereon. Mounted above the motor and within the pedestal is a reduction gear box 84 provided with a power input shaft 85 having secured thereon V pulleys 86, and a power output shaft 87 having mounted thereon a V pulley 88. Mounted on the shaft 77 is a V pulley 89. The pulleys 83 and 86 are connected by a V belt 90 and the pulleys 88 and 89 are connected by a V belt 91.

In order to obtain a sufficient speed reduction from the motor 81 to the shaft 77, the speed of the input shaft 85 to the gear box 84 is reduced by the drive from the small pulley 83 to the large pulley 86, the speed being further reduced within the gear box 84 and being still further reduced by the drive from the small pulley 88 to the large pulley 89. This drive arrangement results in a speed reduction ratio of approximately 3400 to 1, since the optimum speed of the shaft 77 is approximately one-half R. P. M.

Flexible electric cables 92 and 93 lead from hoods 69 and 69' respectively to switch boxes 94 and 95 respectively. These switch boxes are interconnected by a cable 96 and from the switch box 95 a cable 97 passes through the wall of the pedestal 57 to the motor 81. A power supply cable 98 also leads from the switch box 95. The motor and infra red lamp circuits as shown in Fig. 11 are so connected that if either of the switches 94 and 95 is thrown to on position the motor will be energized and the drums will start rotating simultaneously with the energization of the infra red lamps in order to prohibit any possibility of damaging the tires by subjecting them to the heat of the lamps while the tires are at rest.

For economical operation only one drum and one hood would be used unless the quantity of casings to be dried should exceed the number that could be carried on a single drum. Where a large number of casings are to be dried, it is desirable to segregate them generally according to size and dry the casings in order according to this segregation since the hoods are adjustable to improve the efficiency of the machine for different size casings. When a number of large tire casings are being dried on the machine, the hood will be raised to concentrate the heat rays from the lamps on the outer portions of the large casings and when smaller casings are being dried the hoods will be lowered an appropriate amount to properly concentrate the heat rays on the smaller casings.

By the above-described apparatus wet tire casings can be quickly and efficiently dried to a condition in which highly successful repairs may be made and recaps applied. While the apparatus has been particularly described in connection with the drying of tire casings, it will be obvious to those skilled in the art that it may be used for heating or drying other annular objects of a size to be conveniently carried by the rotatable drums.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. A drying machine comprising an upstanding hollow pedestal base, a drum supporting shaft journalled intermediate its length adjacent the upper end of said base, a work receiving drum secured on each end portion of said shaft for rotation therewith, a fixed retaining flange mounted on the inner end of each drum, a removable retaining flange mounted on the outer end of each drum, said removable flange comprising an outer ring member, an inner ring member, spokes connecting said ring members certain of said spokes extending inwardly beyond said inner ring member, clip members mounted on the outer ends of said drums and engageable by said inwardly extending spoke members the engagement and disengagement of said inwardly extending spoke members and said clip members being effected by relative rotation between said removable flange and said drum, spring latch means mounted on the ends of said drums and engaging one of said inwardly extending spokes to prevent accidental relative rotation of said removable flange and said drum, a tubular upstanding member secured to the top of said base, a tubular supporting member slidably received for vertical movement within said upstanding member, spring counterbalance means within said upstanding member and said supporting member to assist in supporting the weight of said supporting member and parts carried thereby, a supporting bar secured intermediate its length to the top of said tubular supporting member, said bar extending above and in spaced parallel relation to said drums, a hood secured to said bar above each of said drums, heat radiating bulbs mounted in said hoods, pivoted handle means operatively engaging said supporting bar for actuation by an operator to raise and lower said hoods, set screw means for locking said hoods in adjusted position, drive means for said drum supporting shaft mounted within said base comprising a motor having a shaft provided with a V pulley, a gear reduction box having input and output shafts provided with V pulleys, a V pulley mounted on said drum supporting shaft and V belts drivingly connecting the respective pulleys, dual switch means mounted on said base connected to said heat radiating bulbs by flexible cables, to said motor and to a source of power whereby upon actuation of either switch the drums will rotate and the bulbs in one hood will be energized and whereby upon actuation of both switches the drums will rotate and the bulbs in both hoods will be energized to distribute the radiated heat uniformly over the work on the drums.

2. A drying machine comprising an upstanding hollow pedestal base, a drum supporting shaft journalled intermediate its length adjacent the upper end of said base, a work receiving drum secured on each end portion of said shaft for rotation therewith, a fixed retaining flange mounted on the inner end of each drum, a removable retaining flange mounted on the outer end of each drum, a tubular upstanding member secured to the top of said base, a tubular supporting member slidably received for vertical movement within said upstanding member, spring counterbalance means within said upstanding member and said supporting member to assist in supporting the weight of said supporting member and parts carried thereby, a supporting bar secured intermediate its length to the top of said tubular supporting member, said bar extending above and in spaced parallel relation to said drums, a hood secured to said bar above each of said drums, heat radiating bulbs mounted in said hoods, pivoted handle means operatively engaging said supporting bar for actuation by an operator to raise and lower said hoods, set screw means for locking said hoods in adjusted position, drive means for said drum supporting shaft mounted within said base comprising a motor having a shaft provided with a V pulley, a gear reduction box having input and output shafts provided with V pulleys, a V pulley mounted on said drum supporting shaft and V belts drivingly connecting the respective pulleys, dual switch means mounted on said base connected to said heat radiating bulbs by flexible cables, to said motor and to a source of power whereby upon actuation of either switch the drums will rotate and the bulbs in one hood will be energized and whereby upon actuation of both switches the drums will rotate and the bulbs in both hoods will be energized to distribute the radiated heat uniformly over the work on the drums.

3. A drying machine comprising an upstanding hollow pedestal base, a drum supporting shaft journalled intermediate its length adjacent the upper end of said base, a work receiving drum secured on each end portion of said shaft for rotation therewith, a fixed retaining flange mounted on the inner end of each drum, a removable retaining flange mounted on the outer end of each drum, a tubular upstanding member secured to the top of said base, a tubular supporting member slidably received for vertical movement within said upstanding member, a supporting bar secured intermediate its length to the top of said tubular supporting member, said bar extending above and in spaced parallel relation to said drums, a hood secured to said bar above each of said drums, heat radiating bulbs mounted in said hoods, handle means operatively engaging said supporting bar for actuation by an operator to raise and lower said hoods, counterbalance means to assist in supporting the weight of said hoods and associated parts, means for locking said hoods in adjusted position, drive means for said drum supporting shaft, dual switch means mounted on said base connected to said heat radiating bulbs by flexible cables, to said motor and to a source of power whereby upon actuation of either switch the drums will rotate and the bulbs in one hood will be energized and whereby upon actuation of both switches the drums will rotate and the bulbs in both hoods will be energized to distribute the radiated heat uniformly over the work on the drums.

4. A drying machine comprising an upstanding hollow pedestal base, a drum supporting shaft journalled intermediate its length adjacent the upper end of said base, a work receiving drum secured on each end portion of said shaft for rotation therewith, a fixed retaining flange mounted on the inner end of each drum, removable retaining means mounted on the outer end of each drum, a tubular upstanding member secured to the top of said base, a tubular supporting member slidably received for vertical movement within said upstanding member, hoods secured to said tubular supporting member extending above and in spaced parallel relation to said drums, heat radiating means mounted in said hoods, means for locking said hoods in adjusted position, drive means for said drum supporting shaft, a source of power for said drive means and said radiating means and means operatively associated with said power source for controlling the operation of said drive means and said radiating means whereby the radiating means will only be energized during rotation of the drums thus distributing the radiated heat uniformly over the work on the drums.

5. A drying machine comprising a single upstanding pedestal base, a shaft journalled in said base, work receiving drums secured on said shaft for rotation therewith, means on each end of said drums for retaining work thereon, a tubular upstanding member secured to the top of said base, a tubular supporting member slidably received for movement within said upstanding member, hoods secured to said tubular supporting member and extending above said drums, heat radiating means mounted in said hoods, means for locking said hoods in adjusted position, compression spring means within said upstanding member and said supporting member constructed and arranged to counterbalance the weight of said supporting member, hoods, and heat radiating means, drive means for said shaft, control means for said drive means and said radiating means, said control means being constructed and arranged to cause the drums to rotate whenever the radiating means is energized thus distributing the radiated heat uniformly over the work on the drums.

6. A drying machine comprising a single upstanding pedestal base, a shaft journalled in said base, work receiving means secured on said shaft for rotation therewith, an upstanding member secured to the top of said base, a supporting member slidably associated with said upstanding member, hoods secured to said supporting member and extending above said work receiving means, heat radiating means mounted in said hoods, compression spring means within said upstanding member and said supporting member constructed and arranged to counterbalance the weight of said supporting member, hoods and heat radiating means, drive means for said shaft, and means for controlling the operation of said drive means and said radiating means whereby the radiating means will only be energized during rotation of said driving means whereby radiated heat is distributed uniformly over the work.

7. A drying machine comprising a support, a shaft journalled on said support, a cylindrical drum on said shaft, a fixed flange at the inner end of said drum, a removable retaining flange at the outer end of said drum, said retaining flange comprising an outer ring member, an inner ring member, spokes connecting said ring members certain of said spokes extending inwardly beyond said inner ring member, clip members mounted on the outer end of said drum and engageable by said inwardly extending spoke members the engagement and disengagement of said inwardly extending spoke members and said clip members being effected by relative rotation between said removable flange and said drum, spring latch means mounted on the end of said drum and engaging one of said inwardly extending spokes to prevent accidental relative rotation of said removable flange and said drum, means for driving said shaft, a hood adjustably supported above said drum, and heat radiating bulbs mounted in said hood.

8. A drying machine comprising a hollow pedestal, a shaft journalled intermediate its length at the upper end of said pedestal, a drum on each end portion of said shaft, a fixed retaining flange mounted on the inner end of each drum, a removable retaining flange mounted on the outer end of each drum, said removable flange comprising an outer ring member, an inner ring member, spokes connecting said ring members certain of said spokes extending inwardly beyond said inner ring member, clip members mounted on the outer ends of said drums and engageable by said inwardly extending spoke members the engagement and disengagement of said inwardly extending spoke members and said clip members being effected by relative rotation between said removable flange and said drums, spring latch means mounted on the ends of said drums and engaging one of said inwardly extending spokes to prevent accidental relative rotation of said removable flange and said drum, a hood above each drum having heat radiating bulbs mounted therein and means for mounting said hoods for vertical movement relative to said drums comprising a bar secured to the upper portions of said hoods, a frame extending downwardly from said bar between said hoods, brackets on said pedestal providing a slidable connection between said frame and said pedestal, means on said brackets to lock said frame in adjustable position, a cable connected at one end to the lower end of said frame and a counter weight connected to the other end of said cable and disposed within said hollow pedestal to assist in holding said hoods in adjusted position relative to said drums.

9. A drying machine comprising a hollow pedestal, a shaft journalled intermediate its length at the upper end of said pedestal, a drum on each end portion of said shaft, a hood above each drum having heat radiating bulbs mounted therein and means for mounting said hoods for vertical movement relative to said drums comprising a bar secured to the upper portions of said hoods, a frame extending downwardly from said bar between said hoods, brackets on said pedestal providing a slidable connection between said frame and said pedestal, a cable connected at one end to the lower end of said frame and a counter weight connected to the other end of said cable and disposed within said hollow pedestal to hold said hoods in adjusted position relative to said drums.

ASHBY L. LEETH.

REFERENCES CITED

The following references are of record in the file of this patent:

UNITED STATES PATENTS

| Number | Name | Date |
|---|---|---|
| 1,047,958 | Lofquist | Dec. 24, 1912 |
| 1,450,022 | Doyle | Mar. 27, 1923 |
| 1,656,824 | Marans | Jan. 17, 1928 |
| 1,998,924 | Crook et al. | Apr. 23, 1935 |
| 2,253,027 | Hall | Aug. 19, 1941 |
| 2,315,124 | Luzius | Mar. 30, 1943 |